(12) United States Patent
Schlangen et al.

(10) Patent No.: US 9,273,717 B2
(45) Date of Patent: Mar. 1, 2016

(54) CONNECTOR FOR LIFELINES

(71) Applicant: D B Industries, Inc., Red Wing, MN (US)

(72) Inventors: David A. Schlangen, Red Wing, MN (US); Robert S. Waddell, Faribault, MN (US); Gabriel G. Gamache, Cottage Grove, MN (US)

(73) Assignee: D B Industries, LLC, Red Wing, MN (US)

( * ) Notice: Subject to any disclaimer, the term of this patent is extended or adjusted under 35 U.S.C. 154(b) by 516 days.

(21) Appl. No.: 13/657,979

(22) Filed: Oct. 23, 2012

(65) Prior Publication Data

US 2013/0104374 A1     May 2, 2013

Related U.S. Application Data

(60) Provisional application No. 61/552,051, filed on Oct. 27, 2011.

(51) Int. Cl.
| | |
|---|---|
| *F16B 45/00* | (2006.01) |
| *F16B 45/02* | (2006.01) |
| *F16B 45/04* | (2006.01) |

(52) U.S. Cl.
CPC ........... *F16B 45/02* (2013.01); *Y10T 24/45372* (2015.01); *Y10T 29/49947* (2015.01)

(58) Field of Classification Search
None
See application file for complete search history.

(56) References Cited

U.S. PATENT DOCUMENTS

| | | | |
|---|---|---|---|
| 1,642,322 A * | 9/1927 | Beck et al. | .................. 24/599.2 |
| 6,073,724 A | 6/2000 | Wolner et al. | |
| 7,946,387 B2 | 5/2011 | Betcher et al. | |
| 8,276,712 B2 | 10/2012 | Smith et al. | |
| 2013/0025968 A1 | 1/2013 | Smith et al. | |
| 2013/0104351 A1 | 5/2013 | Casebolt | |

FOREIGN PATENT DOCUMENTS

| | | |
|---|---|---|
| WO | WO 2009/108648 A2 | 9/2009 |
| WO | WO 2013/063384 A2 | 5/2013 |

OTHER PUBLICATIONS

Photographs of Connector 4007-65 product (2 photos) Date Unknown, 2 pages.

(Continued)

*Primary Examiner* — Jack W Lavinder
(74) *Attorney, Agent, or Firm* — IPLM Group, P.A.

(57) ABSTRACT

A connector that includes a carabiner and an insert is provided. The base of the insert has a length that extends between a first end and a second end and a width that extends between a first side edge and a second side edge. A barrel connector of the insert centrally extends from the first side edge of the base. The barrel connector receives a barrel of a gate of the carabiner. A first ear extends from the second side edge of the base proximate the first end of the base. The first ear includes a first carabiner retaining channel that selectively engages a first portion of the carabiner. A second ear extends from the second side edge of the base proximate the second end of the base. The second ear includes a second carabiner retaining channel that selectively engages a second portion of the carabiner.

17 Claims, 11 Drawing Sheets

(56) References Cited

OTHER PUBLICATIONS

Reliance Connector 4007-65, Reliance Industries—Product Details, [Online] Copyright 2013, Reliance Industries, [Retrieved on Jan. 23, 2013] Retrieved from the Internet <http://www.relsafe.com/ProductDetails.aspx?guid=19df45d8-5ee7-4ec9-833b-21a2ea9f7581&pid=942&sourceUrl=QuickSearch.aspx%3ftxtQuery%3d4007-65%26industryType%3d-1%26productType%3d-1%26pg%3d0>, 1 page.

Reliance Fall Protection—Instructions for Use, 4XXX Series Skyloc™ Self Retracting Lifelines, Copyright 2011 Reliance Fall Protection, 4006-62 Rev B, Reliance Industries, Deer Park, Texas, 28 pages.

Reliance 4007-65 Connector, "StopLite Self Retracting" Product Data Sheet, Rev. A 7.11, Date Unknown, 1 page.

Reliance Connector 400765, "Skylock™ SRL's—Proven Performance, Built to Last", Date Unknown, 1 page.

* cited by examiner

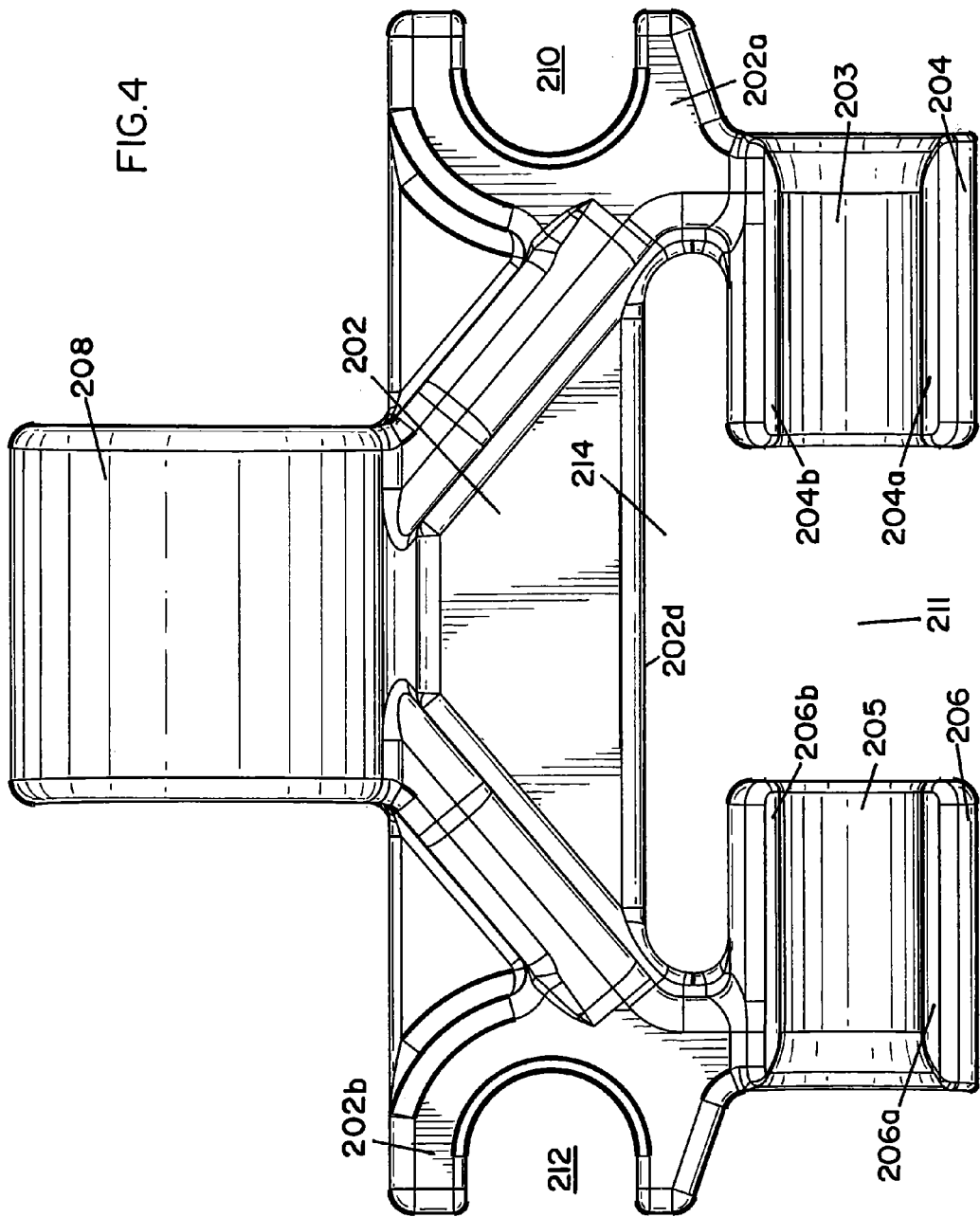

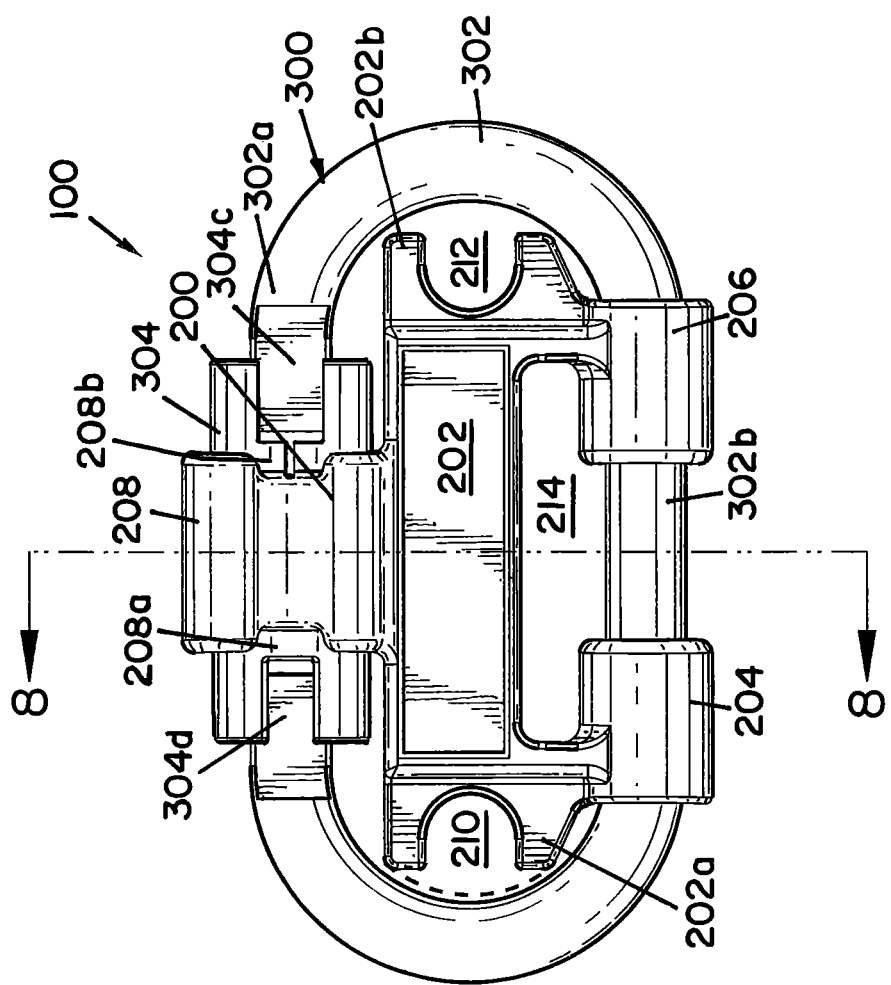
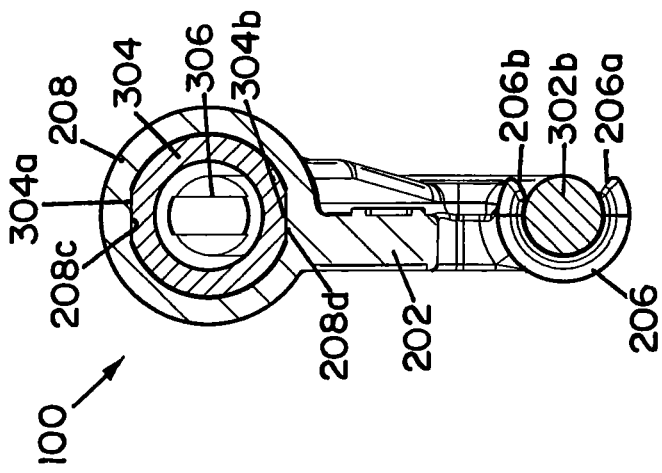

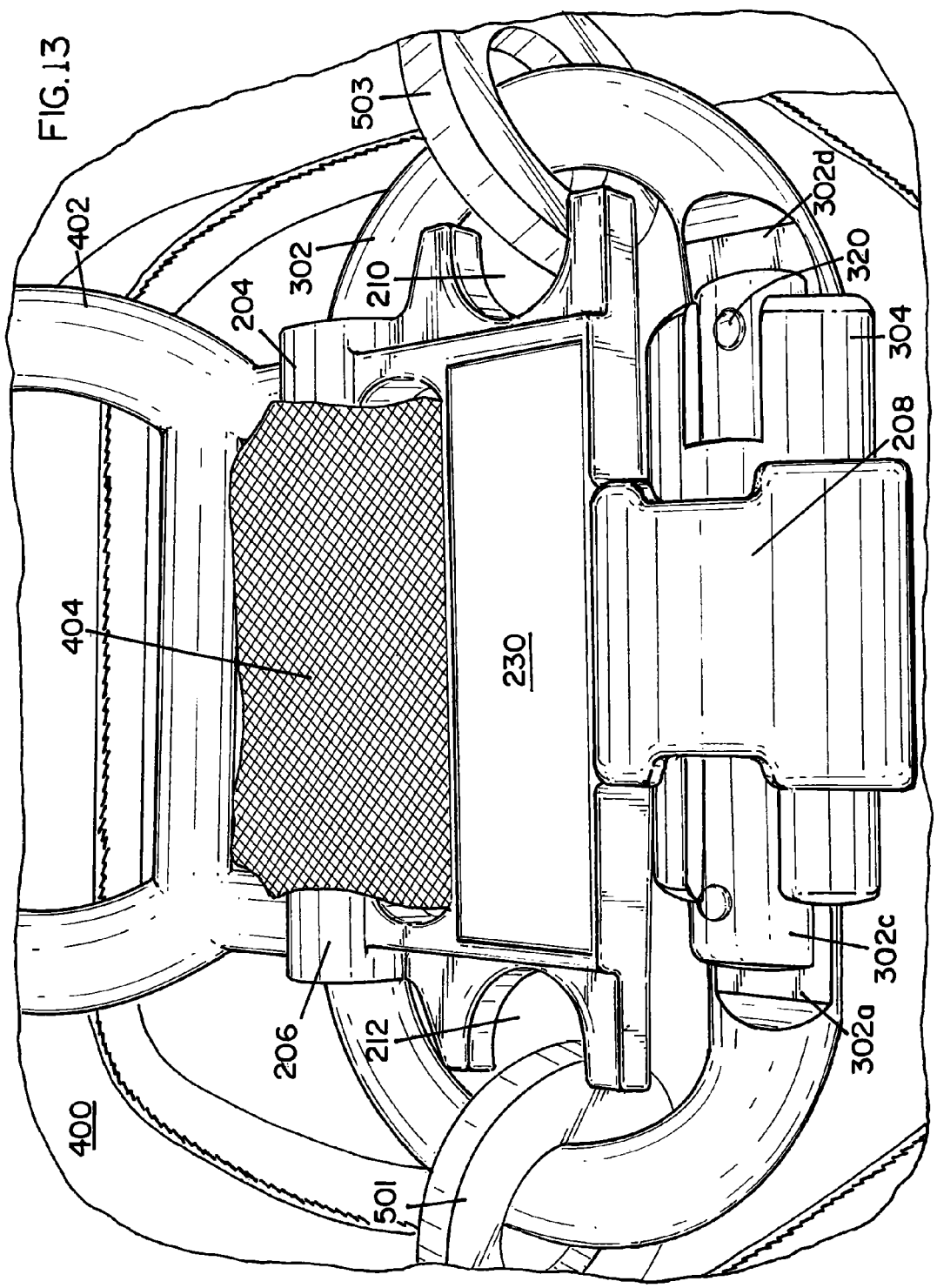

CONNECTOR FOR LIFELINES

CROSS-REFERENCE TO RELATED APPLICATIONS

This application claims priority to U.S. Provisional Application Ser. No. 61/552,051, same title herewith, filed on Oct. 27, 2011, which is incorporated in its entirety herein by reference.

BACKGROUND

Safety harnesses are typically used in work areas that subject workers to the risk of falling. In some high risk areas, a safety harness is coupled to a lifeline that is in turn coupled to a support structure. If a fall event should occur, the lifeline coupled to the support structure limits the fall of the worker donning the safety harness to prevent injuries to the worker. In some work environments, it is necessary for the worker to move about from a first area to a second area. It is common in this situation that the worker will have to disconnect the lifeline from a first support structure in the first area and connect to a second support structure in the second area when moving from the first area to the second area. Hence, there is a period of time, between when the worker disconnects the lifeline from the first support structure and connects the lifeline to the second support structure, in which the lifeline is not connected to a support structure. If a fall event occurs during that period of time the worker has no fall protection. This scenario can be avoided with the use of two lifelines. With the use of two lifelines, one lifeline can always be attached to an associated support structure when moving between areas of the worksite. For example, when a worker needs move from a first area to a second area, the worker simply connects a second lifeline to a support structure in the second area. Once that is completed, the first lifeline is disconnected from the first area. Lifelines can incorporate various types of safety devices such as self-retracting lifeline configurations and energy absorbers known in the art.

For the reasons stated above and for other reasons stated below which will become apparent to those skilled in the art upon reading and understanding the present specification, there is a need in the art for a connector that allows for the connection of two lifelines to a safety harness in an effective and efficient manner.

SUMMARY OF INVENTION

The above-mentioned problems of current systems are addressed by embodiments of the present invention and will be understood by reading and studying the following specification. The following summary is made by way of example and not by way of limitation. It is merely provided to aid the reader in understanding some of the aspects of the invention.

In one embodiment, a connector is provided. The connector includes a carabiner and an insert. The carabiner includes a carabiner body and a gate having a rotating barrel. The insert includes a base, a barrel connector and first and second ears. The base has a length that extends between a first end and a second end and a width that extends between a first side edge and a second side edge. The first end has a first lifeline connection guide formed therein and the second end has a second lifeline connection guide formed therein. The barrel connector centrally extends from the first side edge of the base. The barrel connector has a barrel receiving passage that is configured and arranged to receive the barrel of the gate of the carabiner. The first ear extends from the second side edge of the base proximate the first end of the base. The first ear includes a first carabiner retaining channel that is configured and arranged to selectively engage a first portion of the carabiner. A second ear extends from the second side edge of the base proximate the second end of the base. The second ear includes a second carabiner retaining channel configured and arranged to selectively engage a second portion of the carabiner.

In another embodiment, an insert for a connector is provided. The insert includes a base, a barrel connector and at least one ear. The base has a length that extends between a first end and a second end and a width that extends between a first side edge and a second side edge. The first end has a first lifeline connection guide formed therein and the second end has a second lifeline connection guide formed therein. The base is further configured and arranged to be selectively received within a carabiner. The barrel connector centrally extends from the first side edge of the base. The barrel connector has a barrel receiving passage that is configured and arranged to receive a barrel of a gate of the carabiner. The at least one ear extends from the second side edge of the base. The at least one ear includes a carabiner retaining channel that is configured and arranged to selectively engage a body portion of the carabiner.

In yet another embodiment, a method of attaching two lifelines to a harness is provided. The method includes: opening a gate of a carabiner; loading a first lifeline connector on a carabiner body of the carabiner; positioning webbing of the harness within the carabiner body; loading a second lifeline connector on the carabiner body; closing the gate of the carabiner; and rotating an insert to engage the carabiner body, wherein the rotation of the insert rotates a barrel of the gate to lock the gate of the carabiner.

BRIEF DESCRIPTION OF THE DRAWINGS

The present invention can be more easily understood and further advantages and uses thereof will be more readily apparent, when considered in view of the detailed description and the following figures in which:

FIG. 4 is a bottom view of the insert of FIG. 2;

FIG. 7 is a top view of the connector of FIG. 1;

FIG. 8 is a cross-sectional view of the insert of FIG. 1 along line 8-8 of FIG. 7;

FIG. 13 is a close up view of the connector of FIG. 1 being attached to the safety harness.

In accordance with common practice, the various described features are not drawn to scale but are drawn to emphasize specific features relevant to the present invention. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Figure 1:
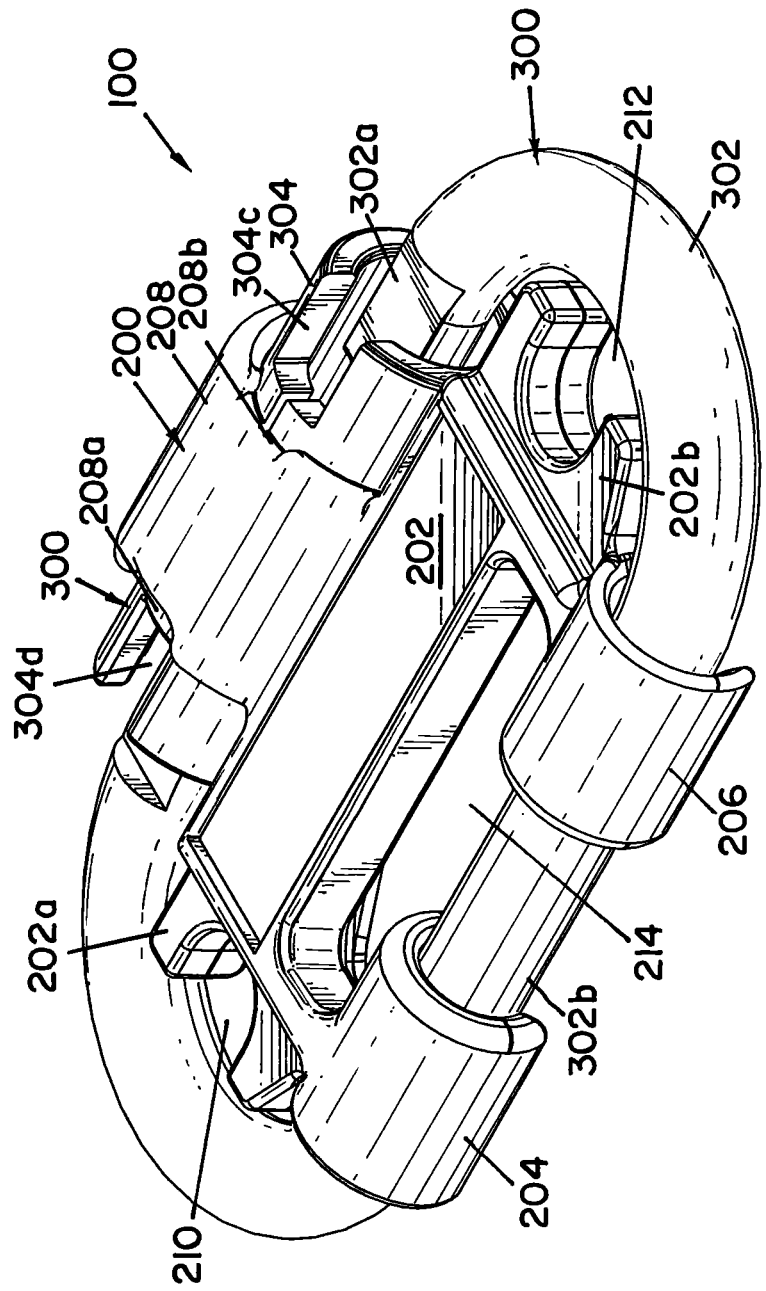
FIG. 1 is a side perspective view of a connector of one embodiment of the present invention.
Figure 2:
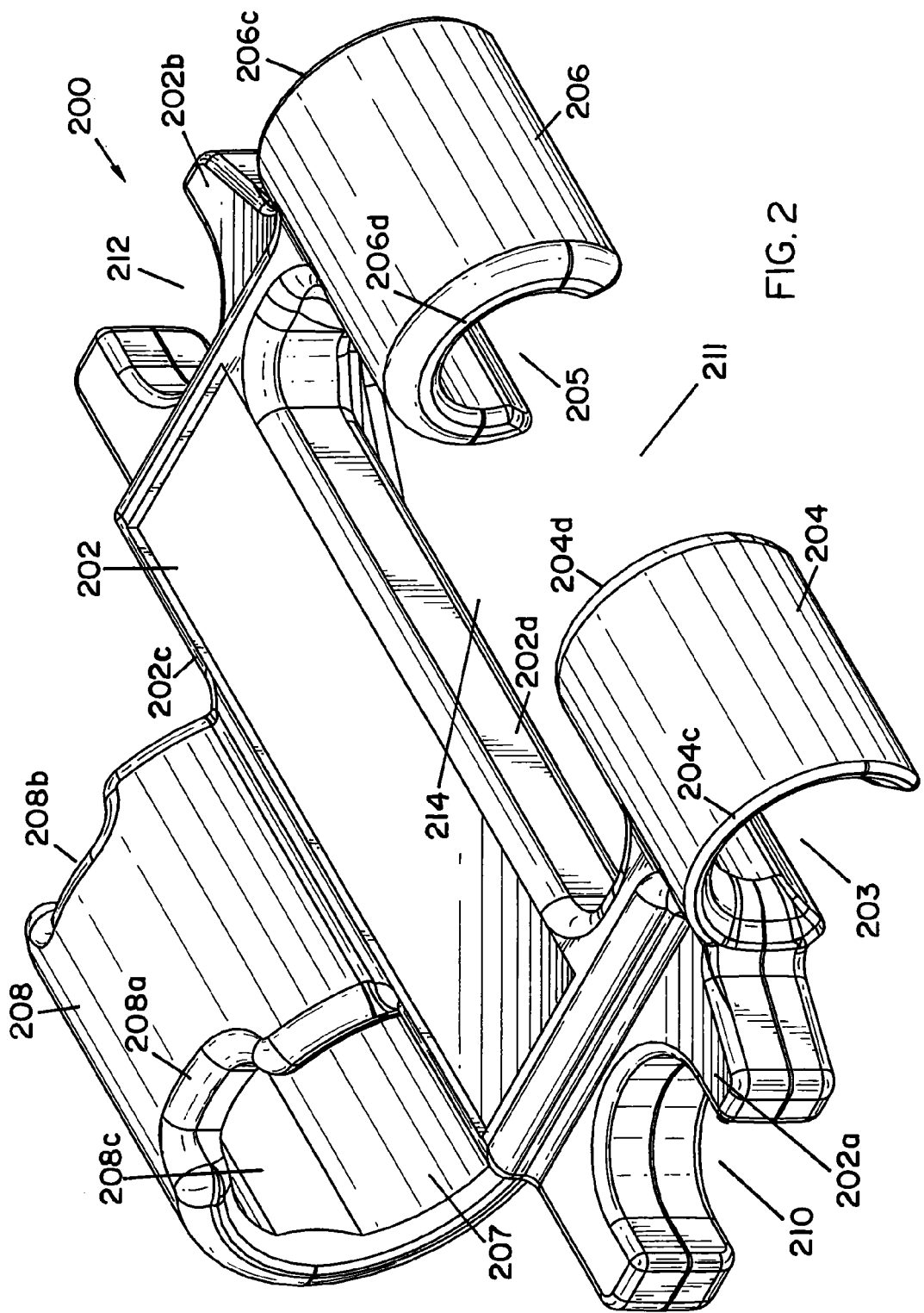
FIG. 2 is a side perspective view of an insert of one embodiment of the present invention.
Figure 9:
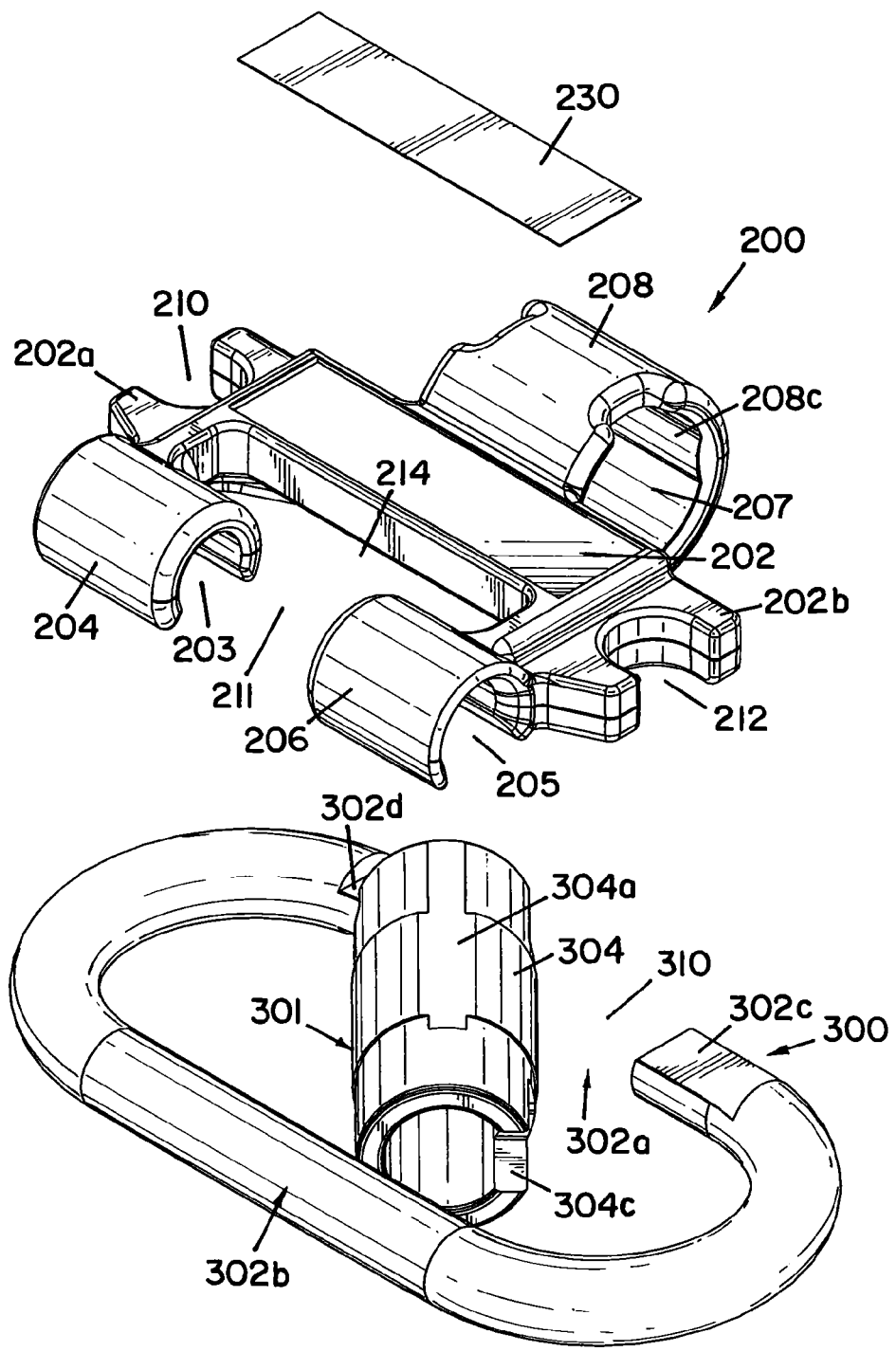
FIG. 9 is an exploded perspective view of the connector of FIG. 1.

Embodiments of the present invention provide a connector to connect two lifelines to a safety harness. In embodiments, a carabiner and an insert are used to form the connector. The connector is configured to space the lifelines apart from each other to help avoid entanglements between the two lifelines and to assist in ease of use. FIG. 1 illustrates a connector of one embodiment. As stated above, the connector 100 includes an insert 200 and a carabiner 300. In embodiments, the insert 200 is operatively coupled to the carabiner 300. Moreover, in one embodiment, a common carabiner 300 is used, such as carabiner 300 illustrated in FIG. 9. The carabiner 300 in this example embodiment includes an oval C-shaped body 302 having an open side 302a and an opposed close side 302b. The open side 302a includes a carabiner opening 310 that is defined by a receiving end 302c and an attaching end 302d. Selectively positioned across the carabiner opening 310 is a gate 301. The gate 301 has a first end that is pivotally coupled to the attaching end 302d of the body 302 and a second end that selectively engages the receiving end 302c of the body 302. In this embodiment, the gate 301 includes a barrel 304 that rotates under a biased force to selectively hold the receiving end 302c of the body 302 within a gate cavity 301a when the gate 301 is closed. As known in the art, the gate 301 is closed by aligning a slot 304c in the barrel 304 with the receiving end 302c of the body 302 and then sliding the receiving end 302c into the gate cavity 301a. The biasing force then rotates the barrel 304 so that the slot 304c is no longer aligned with the receiving end 302c of the body 302 thereby locking the gate 301. To open the gate 301, the barrel 304 is rotated to once again align the slot 304c in the barrel 304 with the receiving end 302c of the body 302. The gate 301 is then pivoted away from the receiving end 302c of the body 302 to allow access to the opening 310 of the carabiner 300. The barrel 304 of this embodiment includes first and second flat surface portions 304a and 304b that are further discussed in detail below. An example of a suitable carabiner is model number S50-507-1K manufactured by Usang Industrial Co. It is recognized that other suitable carabiners could be used.

The insert 200 is shown in FIGS. 2 through 6. The insert 200 includes a generally rectangular base 202. The base 202 has a length that extends from a first end 202a of the base 202 to a second end 202b of the base 202. The base 202 further has a width that extends between a first side edge 202c and a second side edge 202d. A barrel connector 208 extends centrally from the first side edge 202c of the base 202. The barrel connector 208 includes a barrel receiving passage 207 that extends through the length of the barrel connector 208. The barrel connector 208 of the insert 200 further includes cutaway sections 208a and 208b that provide clearance to slots 304c and 304d in the barrel 304 so the barrel connector 208 will not interfere with the operations of the barrel 304 and allows for assembly. The insert 200 further includes a first ear 204 and a second ear 206. The first ear 204 extends from the second side edge 202d of the base 202 proximate the first end of the base 202a. The second ear 206 extends from the second side edge 202d proximate the second end 202b of the base 202. Each of the first and second ears 204 and 206 are partially tubular shaped (or C-shaped) having respective first and second carabiner retaining channels 203 and 205. The first and second carabiner retaining channels 203 and 205 are aligned with each other. Moreover, the first and second carabiner retaining channels 203 and 205 are parallel with the barrel receiving passage 207 of the barrel connector 208 in this embodiment.

Figure 3:
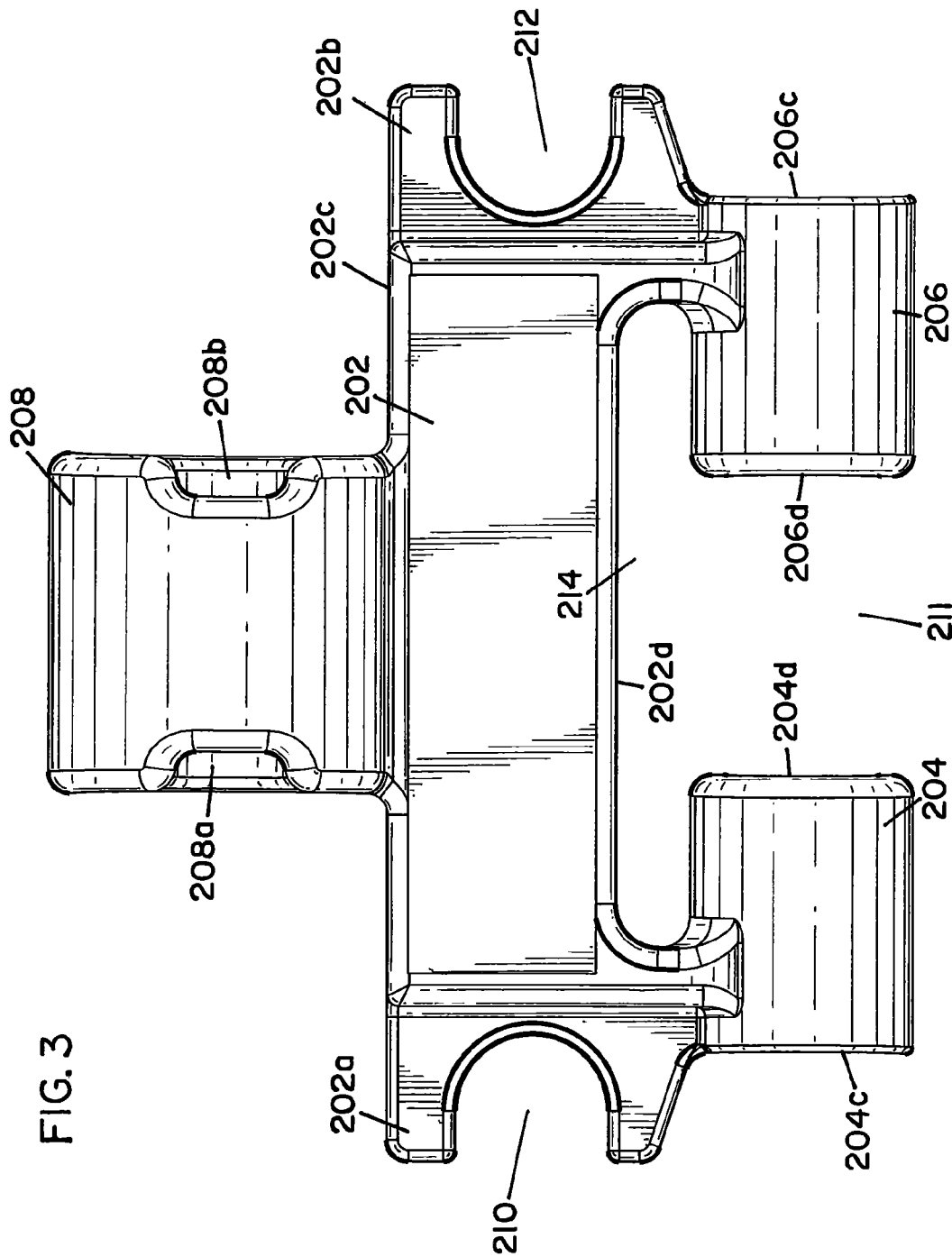
FIG. 3 is a top view of the insert of FIG. 2.

Referring to the top view of FIG. 3, it is illustrated that the first ear 204 has a length that extends from a first end 204c to a second end 204d. The first end 204c of the first ear 204 is coupled proximate the first end 202a of the insert base 202. The length of the first ear 204 extends from the first end 204c of the first ear 204 towards the second ear 206. The second ear 206 has a length that extends from a first end 206c to a second end 206d. The first end 206c of the second ear 206 is coupled proximate the second end 202b of the insert base 202. The length of the second ear 204 extends from the first end 206c of the second ear 206 towards the first ear 204. A webbing opening 211 between the second ends 204d and 206d of the respective ears 204 and 206 provides access to a webbing passage 214 that is defined in part by the second side edge 202d of the insert base 202 and portions of the first and second ears 204 and 206 that extend beyond the respective connections to the base 202. Hence, the configuration of the webbing opening 211 and the webbing passage 214 is generally in a T-shape in this embodiment. In addition, the first and second ends 202a and 202b of the insert base 202 include respective first and second connector lifeline guides 210 and 212. The respective connector lifeline guides 210 and 212 are grooves (or notches) in the respective first and second ends 202a and 202b of the insert base 202 that retain a respective lifeline connector in a select location as further described below.

Figure 6:
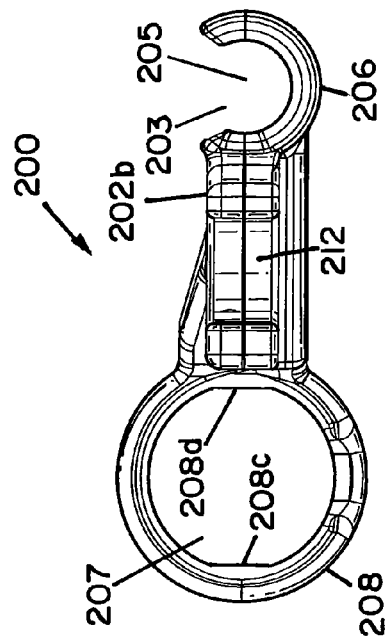
FIG. 6 is a side of the insert of FIG. 2 in an up-side down position.
Figure 5:
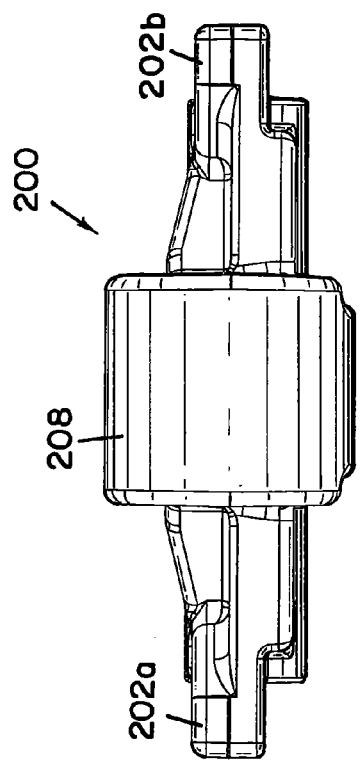
FIG. 5 a front view of the insert of FIG. 2 in an up-side down position.

The bottom view of FIG. 4 further illustrates the first and second carabiner retaining channels 203 and 205 of the respective ears 204 and 206. As illustrated in this bottom view, the first and second ears 204 and 205 have openings along their lengths to the respective first and second carabiner retaining channels 203 and 205. The first ear 204 includes a first retaining edge 204a and a second retaining edge 204b that define the opening to the first carabiner retaining channel 203. The second ear 206 further includes a first retaining edge 206a and the second retaining edge 206b that defines the opening to the second carabiner retaining channel 205. The first and second carabiner retaining channels 203 and 205 are designed to selectively engage the closed side 302b of the carabiner 300 as further discussed below. The side view of the insert 200 shown in FIG. 6 illustrates the positioning of the barrel receiving passage 207 of the barrel 208 and the first and second carabiner retaining channels 203 and 205 of the respective ears 204 and 206. The barrel receiving passage 207 of the barrel 208 includes opposed first and second flat portions 208c in 208d that are further discussed below.

FIG. 7 illustrates a top view of the connector 200 in a locked configuration having the insert 200 mounted on the carabiner 300. Referring to FIG. 8, a cross-sectional view along line 8-8 of FIG. 7 is illustrated. As illustrated, in the locked position, the closed side 302b of the carabiner body 302 is received in the carabiner retaining channel 203 of the first ear 204. Due to the rigidness of the material that forms the insert 100 and the positioning of the first retaining edge 204a in relation to the second retaining edge 204b of the first ear 204, the closed side 302b of the carabiner body 302 is retained in the carabiner retaining channel 203. In one embodiment, the insert is made of a plastic polymer having a select rigidness that allows the first and second retaining edges 294a and 204b to be moved away from each other under pressure (i.e. when the closed side 302b of the carabiner body is being forced into the carabiner retaining channel 203) but retain their original position in relation to each other once the pressure is removed (i.e. once the closed side 302b of the carabiner body is positioned within the carabiner retaining channel 203). A similar arrangement is found in regards to the first retaining edge 206a and the second retaining edge 206b of the second ear 206 to retain the closed side 302b of the carabiner body 302 within the carabiner retaining channel 205 of the second ear 206.

FIG. 8 also illustrates the barrel 304 of the gate 301 received in the barrel receiving passage 207 of the insert 200. As illustrated, the first and second flat portions 208c and 208d in the barrel receiving passage 207 are aligned with opposed flat portions 304a and 304b on an outer perimeter of the barrel 304. This arrangement locks the rotation of the barrel 304 of the gate 301 with the rotation of the insert 200. Hence, when the insert 200 is rotated away from the closed side 302b of carabiner body 302, the barrel 304 of carabiner 300 is rotated thereby countering the biasing locking member 306 in the gate 301. In one embodiment, the barrel connector 208 of the insert 200 is formed-fitted on the barrel 304 of the carabiner 300 so that the insert 200 cannot be easily removed from the carabiner 300. Referring back to the exploded perspective view in FIG. 9, the connector 200 can include a label 230 that may include warnings and other product information. In this embodiment the label is adhered to the base 202 of the insert 200 with an adhesive.

Figure 10:
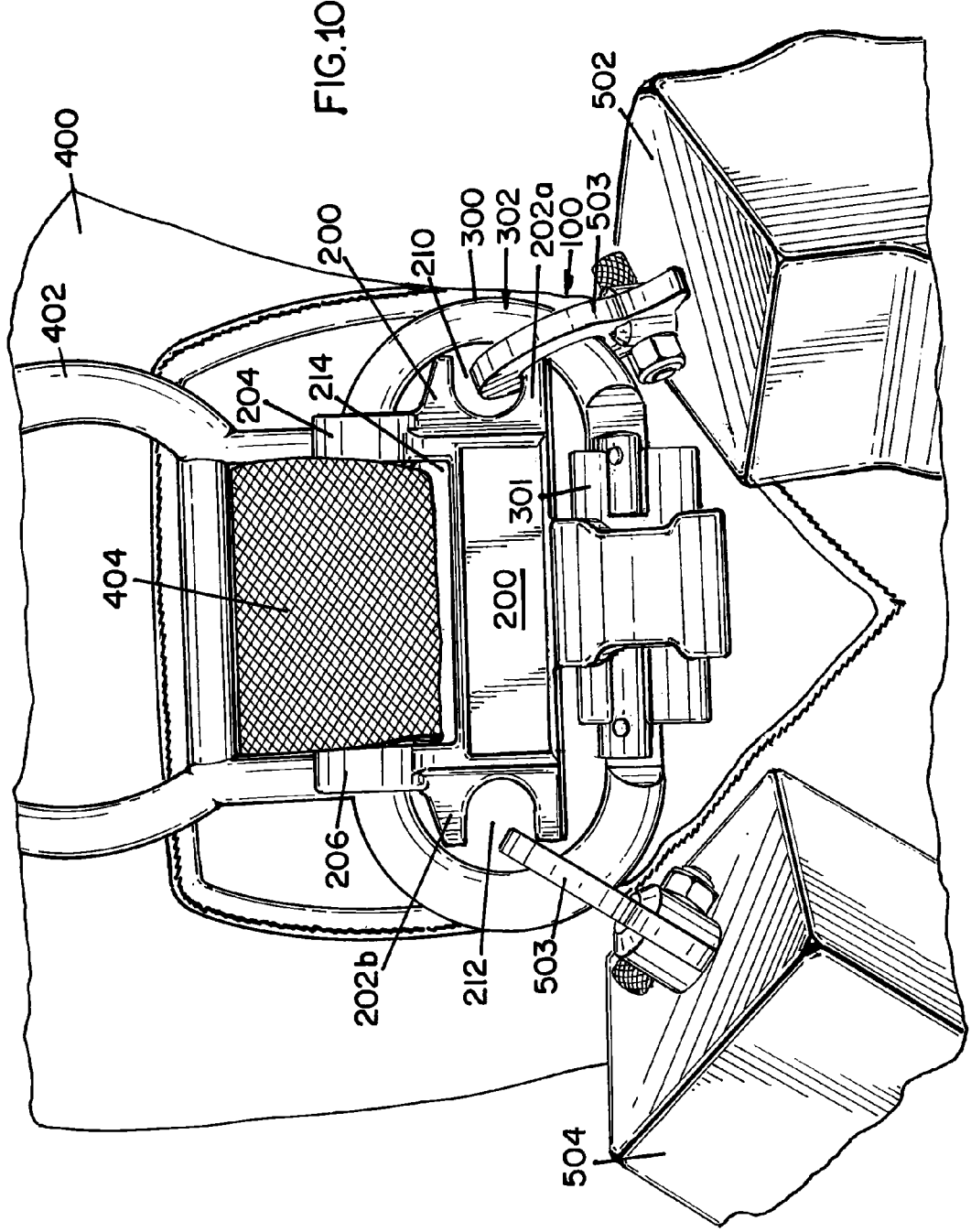
FIG. 10 is an illustration of the connector of FIG. 1 attached to a safety harness.

FIG. 10 provides an illustration of the connector 100 in use. FIG. 10 illustrates the backside of a safety harness 400 and more specifically, a dorsal D-ring assembly. As illustrated, the safety harness 400 includes webbing 404 that couples a D-ring 402 to the safety harness 400. As in a typical arrangement of the safety harness 400, the webbing 404 at the D ring connection is in a criss-cross configuration. The D-ring 402 can be used for rescue if the user of the safety harness 400 encounters a fall event. The webbing 404 is positioned to pass through the webbing passage 214 formed by the second side edge 202d of the insert base 202, portions of the first and second ears 202 and 204 and the closed side 302b of the carabiner body 302. This arrangement couples the connector 100 to the safety harness 400.

As illustrated, this embodiment of the connector 100 can be used to connect two lifelines 502 and 504 to the harness. In particular, a first lifeline connector 501 of the first lifeline 502 is positioned in the first lifeline connection guide 210 of the insert 202 and around the body 302 of the carabiner 300 and a second lifeline connector 503 of the second lifeline 504 is positioned in the second lifeline connection guide 212 of the insert 202 and around the body 302 of the carabiner 300. Hence the insert 200 spaces and retains the first and second lifelines 502 and 504 at a select distance from each other. The use of two lifelines 502 and 504 allows the user to always be connected to a support structure when moving from one support structure to another. One benefit of the connector 100 is that the safety lines 502 and 504 are not coupled to the D-ring 402. Therefore, the D-ring 402 remains unobstructed should a rescue operation be necessary.

Figure 11:
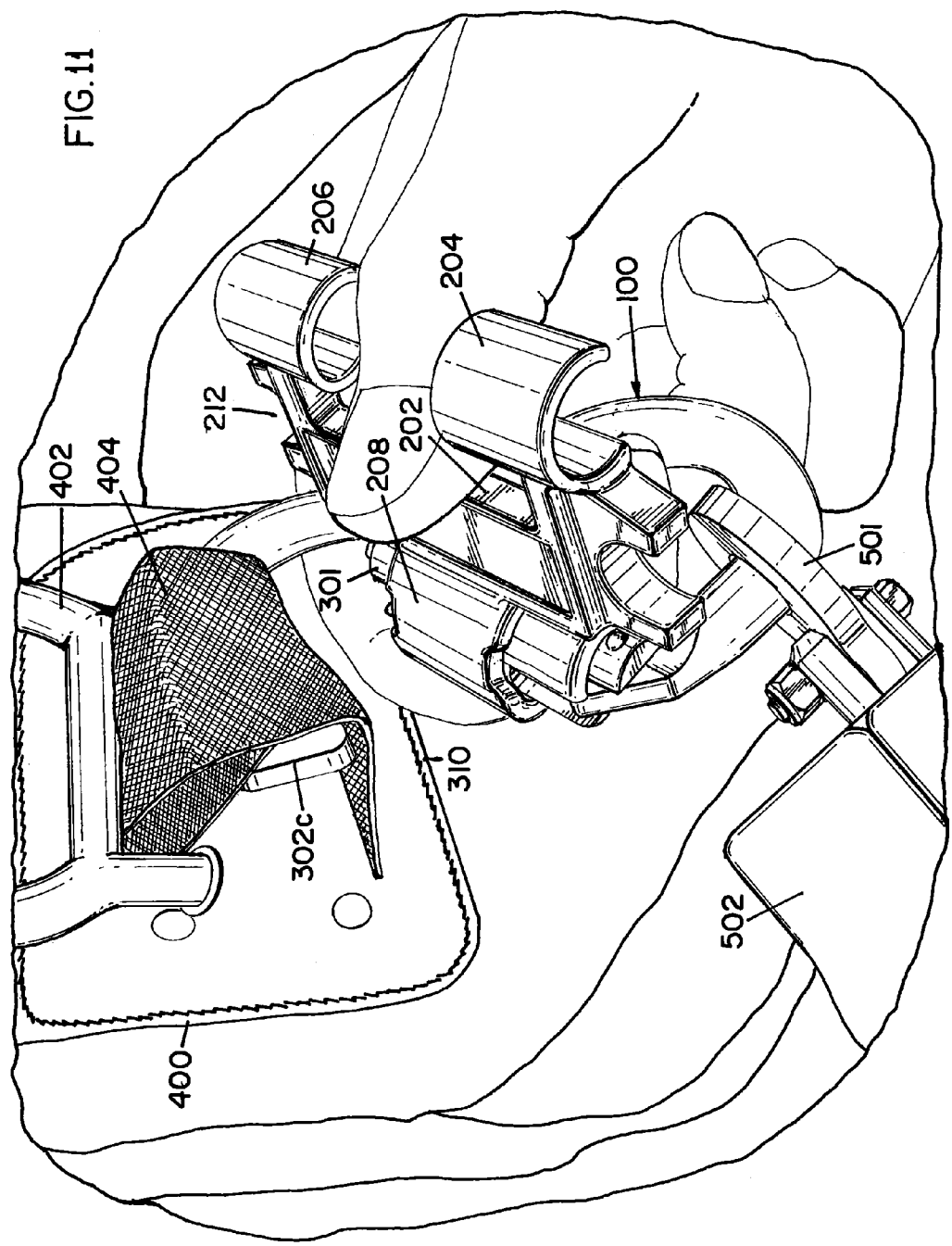
FIG. 11 is an illustration of the connector of FIG. 1 being attached to the safety harness.
Figure 12:
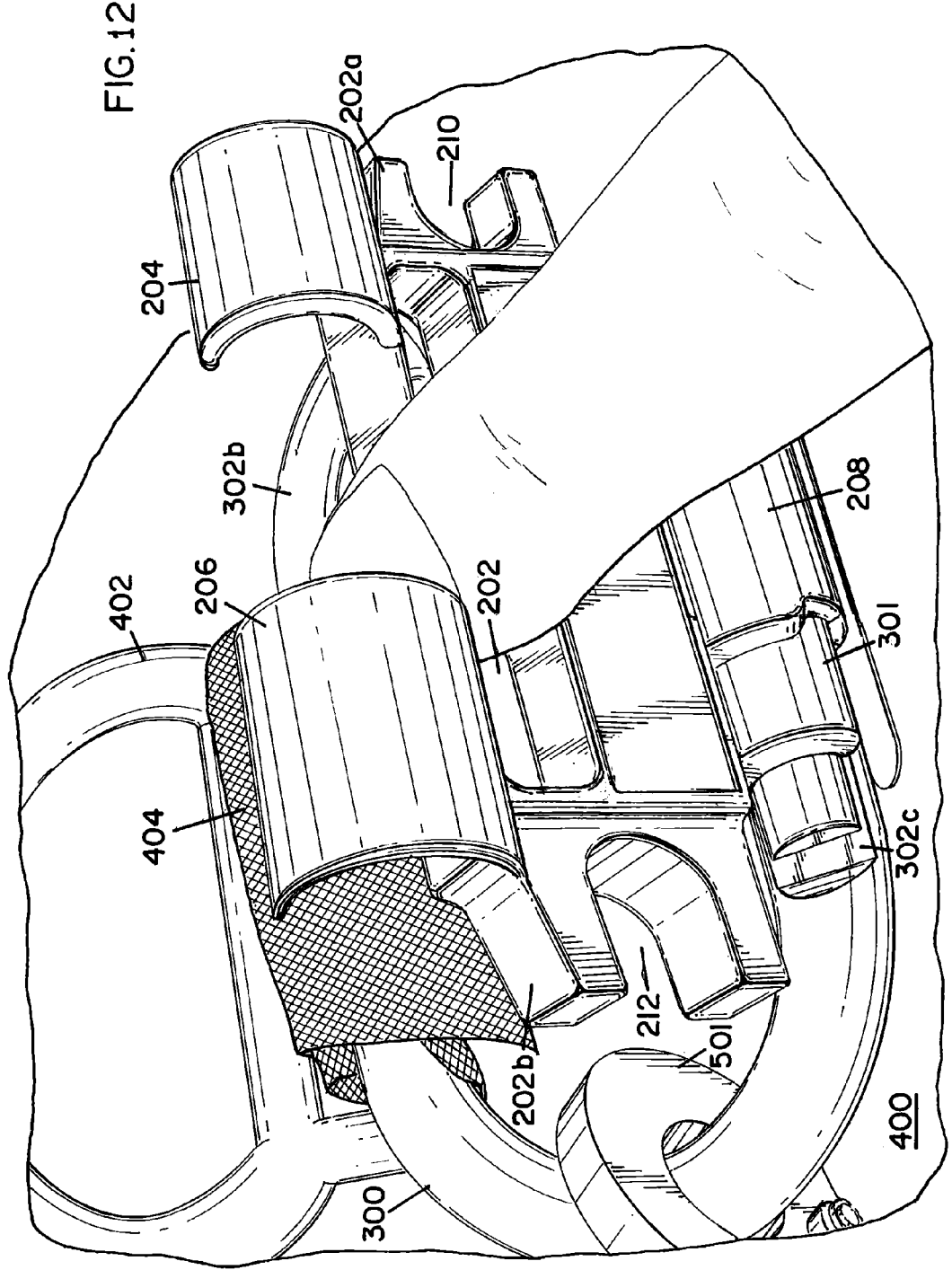
FIG. 12 is further another illustration of the connector of FIG. 1 being attached to the safety harness.

As briefly discussed above, rotation of the insert 200 rotates the barrel 304 of the gate 301. Rotation of the gate 301 in turn aligns the slot 304c in the barrel 304 with the receiving end 302c of the body 302 which allows the gate 301 to be opened. Referring to FIG. 11, an illustration of the gate 301 in an open position to connect the lifelines 502 and 504 (not shown in FIG. 11) and to connect the connector 100 to the webbing 404 is illustrated. Once the gate 301 is open, a carabiner passage in each lifeline connector 303 and 305 is positioned to receive the receiving end 302c of the carabiner body 302. The respective lifeline connector 103 and 105 is then slid around the body 302 to a respective position that aligns with the respective lifeline connector guide 210 and 212 of the insert body 202 when the connector 100 is in the locked position. In FIG. 11, lifeline connector 501 has been attached to the carabiner body 302 and is positioned to align with its associated lifeline connector guide 210. Also in FIG. 11, the webbing 404 is being positioned within the carabiner body 302. Next, a carabiner passage of the second lifeline connector 305 would receive the receiving end 302c of the carabiner body 303 and be slid to its respective position as illustrated in FIG. 12.

Once the first and second lifeline connectors 501 and 503 and the webbing 404 are properly positioned in regards to the connector 100, the insert 200 is allowed to rotate which in turn rotates the barrel 304 thereby locking the gate 301 of the carabiner 300. The webbing 404 is bunched up (pinched) to pass through the webbing opening 211 defined by the ear edges 204d and 206d. The closed side 302b of the carabiner body 302 is then received in the respective carabiner retaining channels 203 and 205 of the respective ears 204 and 206 of the insert 200. Once through the webbing opening 211, the webbing 404 is spread out in the webbing passage 214 that is defined in part by the second side edge 202d of the insert base 202 and portions of the first and second ears 204 and 206 that extend beyond the respective connections to the base 202. This is illustrated in FIG. 13. Once the webbing 404 is spread out in the webbing passage 214, the webbing 404 engages the portions of the first and second ears 204 and 206 that extend beyond the respective connections to the base 202. This configuration of the webbing 404 biases the first and second ears 204 and 206 onto the carabiner body 302 to help prevent movement of the insert 200 in relation to the carabiner 300 thereby keeping the carabiner gate 301 locked. Hence, three different forces are used in this embodiment to assure the connector does not come unintentionally unlocked. The first is the biasing force of the bias locking member 306 in the gate 301; the second is the configuration and characteristics of the respective ears 204 and 206 that retain the carabiner body 202 within the respective carabiner retaining channels 203 and 205 and; thirdly, the webbing 404 biasing the ears 204 and 206 into the carabiner body 302.

To disconnect the lifelines 502 and 504 or webbing 404 from the connector 100, the webbing 404 is once again bunched up (pinched) so the webbing 404 no longer covers the portions of the first and second ears 204 and 206 that extend beyond the respective connections to the base 202. Once the webbing 404 is out of the way of the ears 204 and 206, the insert 200 is forcefully rotated to remove the carabiner body 202 from the respective carabiner retaining channels 203 and 205 of the respective ears 204 and 206 and to counter the biasing locking member 306. The rotation of the insert 200 rotates the barrel 304 of the gate 301. When the slot 304c in the barrel 304 aligns with the receiving end 302c of the body 302, the gate 301 can be rotated about the pivot 320 into an open configuration such as that illustrated in FIG. 11. Once open the lifeline 502 and 504 or webbing 404 can be disconnected from the connector 100.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A connector comprising:
   a carabiner including a carabiner body and a gate having a rotating barrel; and
   an insert including,
      a base having a length extending between a first end and a second end and a width extending between a first side edge and a second side edge, the first end having a first lifeline connection guide formed therein and the second end having a second lifeline connection guide formed therein,
      a barrel connector centrally extending from the first side edge of the base, the barrel connector having a barrel receiving passage configured and arranged to receive the barrel of the gate of the carabiner, the barrel connector further having a shape that locks rotation of the barrel of the gate of the carabiner with rotation of the insert,
      a first ear extending from the second side edge of the base proximate the first end of the base, the first ear including a first carabiner retaining channel and a first ear opening that extends along an entire length of the first carabiner retaining channel, the first ear opening configured and arranged to selectively allow passage of a first portion of the carabiner body in the first carabiner retaining channel, and
      a second ear extending from the second side edge of the base proximate the second end of the base, the second ear including a second carabiner retaining channel and a second ear opening that extends a length of the second carabiner retaining channel, the second ear opening configured and arranged to selectively engage a second portion of the carabiner body in the second carabiner retaining channel.

2. The connector of claim 1, further comprising:
   the insert further having a webbing passage configured and arranged to receive a webbing of a fall protection harness, the webbing passage defined in part by a portion of the second side edge of the insert base and portions of the first and second ears that extend towards each other beyond respective connections to the base.

3. The connector of claim 2, further comprising:
   the insert further having a webbing opening positioned between the first and second ears to the webbing passage, the webbing opening and webbing passage formed in a general T-shape.

4. The connector of claim 1, wherein the first carabiner retaining channel of the first ear and the second carabiner retaining channel of the second ear run parallel with the barrel receiving passage of the barrel connector.

5. The connector of claim 1, wherein each of the first and second ears further comprise:
   spaced first and second retaining edges that define the respective first and second carabiner openings to the respective first and second carabiner retaining channels.

6. The connector of claim 1, wherein the barrel connector of the insert further comprises:
   at least one flat portion formed within the barrel receiving passage, the at least one flat portion within the barrel receiving passage configured and arranged to correspond with at least one flat portion on an outer surface of the barrel to lock the rotation of the insert in relation to the barrel.

7. The connector of claim 1, wherein each of the first and second lifeline guides are grooves in the respective first and second ends of the insert base configured and arranged to hold lifeline connectors in static spaced locations in relation to each other.

8. An insert for a connector, the insert comprising:
   a base configured and arranged to be selectively received within a carabiner, the base having a first lifeline groove and a second lifeline groove, the first lifeline groove spaced a select distance from the second lifeline groove;
   a barrel connector centrally extending from a first edge of the base, the barrel connector having a barrel receiving passage configured and arranged to receive a barrel of a gate of the carabiner;
   at least one ear extending from a second edge of the base, the at least one ear including a carabiner retaining channel, the at least one ear having an opening to the carabiner retaining channel, the opening in the at least one ear extending along an entire length of the carabiner retainer channel, the opening configured and arranged to selectively allow passage of a body portion of the carabiner into and out of the carabiner retaining channel;
   wherein the at least one ear includes a first ear extending from the second edge proximate a first end of the body and a second ear extending from the second edge proximate a second end of the body;
   the first ear having a length extending between a first end and a second end of the first ear, the first ear extending from the second edge of the body proximate the first end of the first ear, the second end of the first ear being at a spaced distance from the second edge of the body; and
   the second ear having a length extending between a first end and a second end of the second ear, the second ear extending from the second edge of the body proximate the first end of the second ear, the second end of the second ear being at a spaced distance from the second edge of the body and a spaced distance from the second end of the first ear to form a generally T-shaped passage through the insert.

9. The insert of claim 8, wherein the first ear includes a first carabiner retaining channel that extends along a length of the first ear and the second ear includes a second carabiner retaining channel that extends along a length of the second ear, the first carabiner retaining channel and the second retaining channel configured in a parallel arrangement with the barrel receiving passage of the barrel connector.

10. The insert of claim 8, further comprising:
    the barrel receiving passage of the barrel connector having a shape that is configured to engage the shape of a barrel of a carabiner to lock the rotation of the barrel of the carabiner to the rotation of the insert.

11. The insert of claim 8, wherein the shape of the barrel receiving passage includes at least one flat portion.

12. The insert of claim 8, wherein the first lifeline groove in the body and the second lifeline groove in the body are configured and arranged to space lifeline connectors coupled to the carabiner.

13. An insert for use with a carabiner comprising:
    a base;
    a barrel connector extending from a first side of the base, the barrel connector having a barrel receiving passage configured and arranged to receive at least a portion of a barrel of a gate of the carabiner, the barrel connector having a shape that locks rotation of the barrel of the gate of the carabiner with rotation of the insert; and at least one ear extending from a second side of the base, the at least one ear including a carabiner retaining channel and an opening, the opening in the at least one ear extending along an entire length of the carabiner retaining channel, the opening configured and arranged to selectively allow a body portion of the carabiner into and out of the carabiner retaining channel.

14. The insert of claim 13, wherein the at least one ear includes a first ear extending from the second side proximate a first end of the body and a second ear extending from the second side proximate a second end of the body.

15. The insert of claim 14, wherein the first ear includes a first carabiner retaining channel that extends along a length of the first ear and the second ear includes a second carabiner retaining channel that extends along a length of the second ear.

16. The insert of claim 14, wherein the first ear and the second ear are spaced a select distance from each other to allow at least one webbing from a fall arrest harness to be positioned between the first and second ears.

17. The insert of claim 14, wherein a first lifeline connection guide is formed between the barrel connector and the first ear and a second lifeline connection guide is formed between the barrel connector and the second ear.

* * * * *